Sept. 2, 1952 M. BENEDICT 2,609,059
MASS DIFFUSION PROCESS AND APPARATUS
Filed June 29, 1948 2 SHEETS—SHEET 1
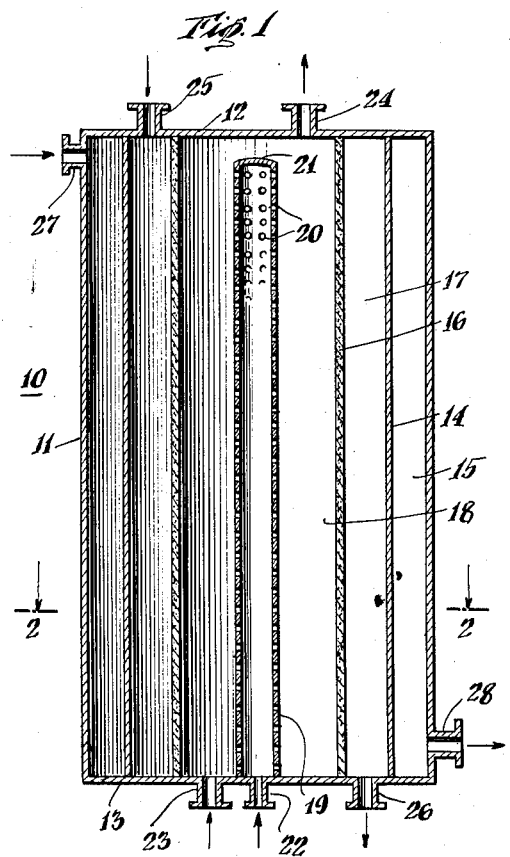
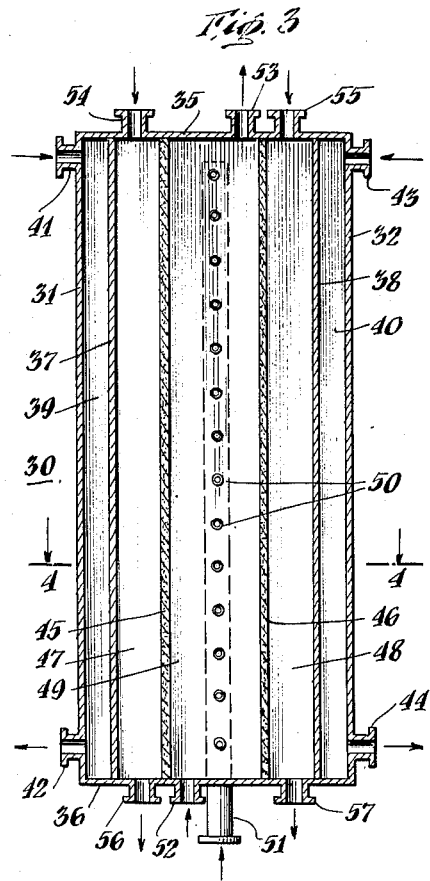
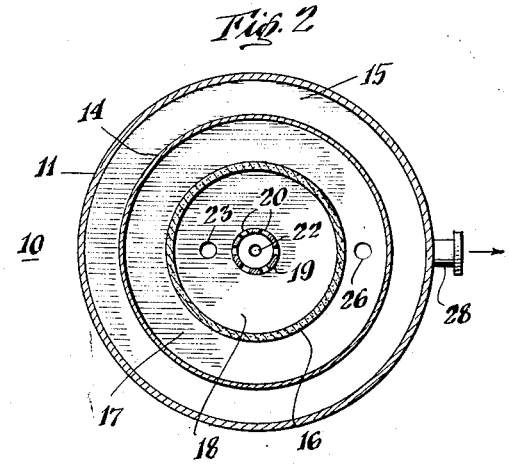
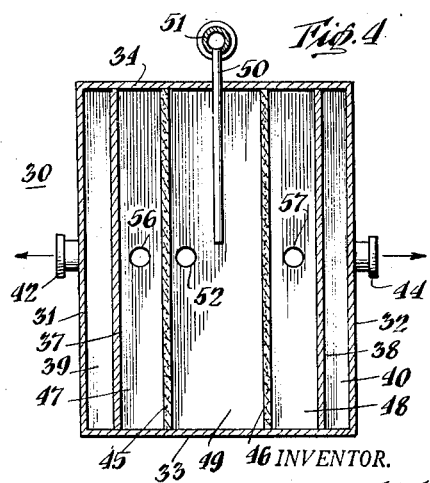
INVENTOR.
Manson Benedict
BY Paul W. Garbo
ATTORNEY Sept. 2, 1952  M. BENEDICT  2,609,059
MASS DIFFUSION PROCESS AND APPARATUS
Filed June 29, 1948  2 SHEETS—SHEET 2
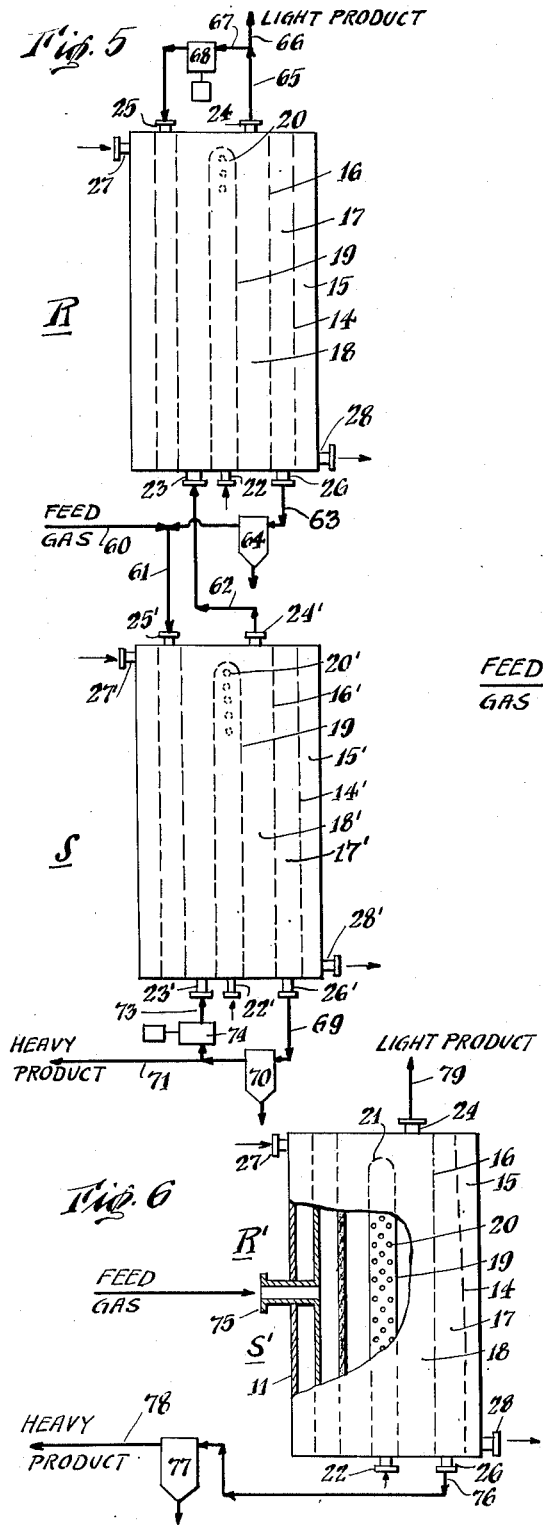
INVENTOR
Manson Benedict
BY
Paul W. Garbo
ATTORNEY Patented Sept. 2, 1952

2,609,059

UNITED STATES PATENT OFFICE 2,609,059

MASS DIFFUSION PROCESS AND APPARATUS

Manson Benedict, Westfield, N. J., assignor to Hydrocarbon Research, Inc., New York, N. Y., a corporation of New Jersey Application June 29, 1948, Serial No. 35,823

13 Claims. (Cl. 183—2)

This invention relates to a process for effecting separation of a mixture of gases by mass diffusion and to new and improved apparatus for effecting such separation. In the mass diffusion process, separation of the components of a gas mixture is effected by taking advantage of differing diffusion velocities of the components into a condensible vapor which is caused to flow into the mixture to be separated.

It is an object of this invention to provide a mass diffusion process of greater efficiency and economy than has been realized with prior known processes. Another object is to provide such a process which requires substantially less stages for obtaining the desired separation of the components of a gas mixture.

Still another object is to provide a mass diffusion apparatus which is simpler in design, less costly to construct and more efficient in operation than heretofore known apparatus.

Other objects and advantages of this invention will be apparent from the following detailed description thereof taken in connection with the accompanying drawings in which:

Figure 1 is a vertical section through a mass diffusion column embodying this invention;

Figure 2 is a horizontal section through the column of Figure 1 taken in a plane passing through line 2—2 of Figure 1;

Figure 3 is a vertical section through a modified form of mass diffusion column embodying this invention;

Figure 4 is a horizontal section through the column of Figure 3 taken in a plane passing through line 4—4 of Figure 3;

Figure 5 is a diagrammatic view showing a pair of columns each of the type of Figure 1 arranged to effect separation of a gas mixture into its components;

Figure 6 is a diagrammatic view showing still another modified type of column embodying this invention; and Figure 7 is a diagrammatic view of a cascade of mass diffusion columns for effecting separation of a gas mixture into its components. The system of Figure 7, involving as it does a substantially larger number of columns or stages gives more complete separation of a gaseous mixture into its components than the systems of Figures 5 and 6.

Referring first to Figures 1 and 2 of the drawings, 10 indicates a column of cylindrical shape consisting of cylindrical side wall 11, top 12 and base 13. A cylindrical wall 14 is welded or otherwise suitably secured to the top 12 and base 13 to define with the outer wall 11 an outer annular cooling chamber or jacket 15. Disposed concentric with cylindrical wall 14 and extending from base 13 to top 12 is a cylindrical diffusion screen or barrier 16. An annular outer flow path 17 for gas is thus defined by screen 16 and cooling wall 14. Flow path 17 is concentric with flow path 18 for gas disposed within screen 16, both flow paths extending from bottom to top of column 10.

Positioned along the longitudinal axis of column 10 and thus centrally of flow path 18 and extending from the base 13 to near the top 12, as shown in Figure 1, is a distributor 19 for introducing a readily condensible vapor into flow path 18. Distributor 19 is provided with openings 20 in the side walls thereof so that the vapor exists therefrom into path 18, the openings 20 being so disposed about the periphery of distributor 19 that the vapor is projected into contact with substantially the entire area of screen 16. Distributor 19 is closed at its top 21 and provided with a base inlet 22 for the condensible vapor which may be any vapor readily condensible under the conditions prevailing in the column 10 and thus separable from the gaseous mixture. Steam and carbon tetrachloride are examples of suitable vapors.

Flow path 18 is provided with a base gas inlet 23 and a top outlet 24; in the example of Figure 1 flow through this flow path takes place from bottom to top. If the mixture in flow path 18 is denser than that in flow path 17, flow from top to bottom will be preferable. In the example of Figure 1, outer concentric annular flow path 17 is provided with a top gas inlet 25 and a base outlet 26. Whatever the direction of flow in path 18 is, flow through path 17 takes place countercurrent to the direction of flow through flow path 18. Annular cooling chamber 15 is provided with an inlet 27 for a cooling medium, desirably water, and an outlet 28.

With the exception of diffusion screen or barrier 16, the structure hereinabove described may be of impermeable metal, preferably steel, resistant to corrosion by the gases, condensible vapor and condensate flowing in contact therewith. The screen 16 may be any well known type of diffusion screen, metallic or ceramic, having capillary pores or openings desirably of uniform size. For example, screen 16 may have a thickness of from 0.005 to 0.25 inch, have from 1% to 30% free area and the holes or openings therein have a diameter of from 1 to 20 microns. Preferably this screen shall be as thin as possible and have as great a free area as possible while retaining adequate strength; a thickness of 1/16 inch and 10% free area are in the preferred range. The diameter of the holes should be as small as possible without sacrifice of uniformity or free area; 2 microns is a preferred diameter.

The modification of Figures 3 and 4 differs from that of Figures 1 and 2 chiefly in that the diffusion column 30 is of rectangular shape, not cylindrical as in the case of column 10, Figure 1. In Figures 3 and 4 the rectangular column housing consists of a front wall 31, back wall 32, side walls 33 and 34, top 35 and base 36. A pair of interior walls 37 and 38 are spaced, respectively, from walls 31 and 32 to define a pair of cooling jackets or chambers 39 and 40. Jacket 39 has a top inlet 41 and a base outlet 42. Jacket 40 is provided with a top inlet 43 and a base outlet 44. A pair of parallel diffusion screens 45 and 46 each extending from base 36 to top 35 is disposed in spaced parallel relationship in column 30. There is thus produced a flow path 47 defined by cooling wall 37 and screen 45, flow path 48 defined by cooling wall 38 and screen 46 and a flow path 49 defined by the screens 45 and 46. These three flow paths are disposed in parallel contiguous relationship, flow path 49 being between paths 47 and 48 and the outer portion of the latter two paths cooled by the cooling medium flowing through jackets 39 and 40. Disposed at spaced points along flow path 49 is a plurality of vapor inlet pipes 50 leading from a main 51 positioned exteriorly of wall 34. A readily condensible vapor is introduced into flow path 49 by pipes 50 through substantially the full length of this path 49.

Flow path 49 is provided with a base inlet 52 and a top outlet 53; flow through this path takes place from bottom to top of the column. Path 47 is provided with a top inlet 54 and a base outlet 56 and path 48 with a top inlet 55 and a base outlet 57. Flow through paths 47 and 48 thus takes place, as indicated by the arrows on Figure 3, from top to bottom countercurrent to the direction of flow through interior path 49.

With minor modifications, two or more of the flat-plate type of mass diffusion column shown in Figures 3 and 4 can be arranged in side by side relation to form a unitary apparatus of multiple columns. For instance, two such columns can be laterally joined so that the cooling jacket 40 of one column also provides a cooling surface to gas path 47 of the other contiguous column which now no longer needs the separate cooling jacket 39. Thus, the laterally joined pair of columns has only three cooling jackets, one between the two columns and one on the side of each column farthest from the jacket serving both columns.

In Figure 5, two columns, each of the type shown in Figure 1, are interconnected to effect separation of a gaseous mixture, say carbon dioxide and hydrogen, or other gaseous mixtures. The top column R may be regarded as a rectifying section to concentrate the light component in the top product. Its parts are designated by the same reference numerals as those of Figure 1. The lower column S may be regarded as a stripping section to remove light component from the bottom product. Its parts are designated by the same reference characters as those of Figure 1, except that they are now primed. The gaseous mixture is introduced through a feed line 60 which leads into a line 61 communicating with inlet 25', the gas flowing into path 17', carrying the heavy fraction in the stripping section. Outlet 24', carrying the light fraction from the stripping section, is connected by a line 62 with inlet 23, carrying the light fraction to the rectifying section. A line 63 leads from outlet 26, carrying the heavy fraction from the rectifying section, through a condensate trap 64 into line 61. Alternatively, the gaseous feed can be admitted into line 62.

A line 65 leads from outlet 24 and is provided with a branch 66 for withdrawal of the top product and a second branch 67 for top product reflux having a pump 68 therein and leading to inlet 25. Stripping section S has a line 69 leading from outlet 26' through a condensate trap 70 and is provided with one branch 71 for withdrawal of bottom product and another branch 73 for bottom product reflux, provided with a pump 74 and leading into inlet 23'.

In the operation of the mass diffusion apparatus of Figure 5, steam or other readily condensible vapor is introduced into column S through inlet 22' and into column R through inlet 22, the steam being distributed throughout substantially the entire area of the screens 16' and 16, respectively. The gaseous mixture enters through line 60 and once operation is commenced mixes in line 61 with a gas stream flowing from column R through line 63 leading into line 61. The resultant mixed gas flows through path 17' diffusing into the steam in this flow path which steam has passed through screen 16'. The lighter component diffuses through the steam passing through screen 16' and enters flow path 18'. The steam passing through screen 16' is condensed on wall 14' by the cooling action of jacket 15'. This prevents accumulation of steam in path 17' which would tend to prevent diffusion of steam through the screen 16'. As the gaseous mixture flows downward through path 17' more and more of the lighter component leaves path 17' by diffusion through screen 16' into path 18' and more and more of the heavy component enters path 17' by flow through the screen in the same direction as the condensible vapor. As a result, the gas flowing downward through path 17' is progressively enriched relative to the heavier component. By the time the gas mixture flowing downward through path 17' reaches the bottom outlet 26', it is stripped of as much of the light component as may be desired. This fraction flows through line 69 and trap 70, where water is removed therefrom. A portion of the exiting gas is withdrawn as bottom product through branch line 71 and the remainder is returned as bottom reflux by pump 74 through branch line 73 into inlet 23' leading into path 18'.

As the gaseous mixture flows upward through path 18', it is progressively enriched relative to the lighter component, because of the diffusion of this component through the screen 16' from path 17' to path 18', and the flow of heavier component through the screen 16' in the opposite direction. Thus the gas mixture in its flow upward through path 18' is stripped of a substantial portion of its heavier component.

Complete removal of the heavier component from this stream is not possible because of the appreciable concentration of heavier component in the stream entering connection 25', owing to the heavier component present in the feed. To complete the removal of heavier component from the stream flowing upward through 18', the stream is removed from column S through outlet 24', and led through line 62 and inlet 23 into flow path 18 in rectifying column R.

As the gaseous mixture flows upward through path 18 in rectifying column R, it is progressively depleted in the heavier component, because of the flow of this component with the condensible vapor through the screen 16 from path 18 to path 17, and the flow of lighter component by diffusion through the screen 16 in the opposite direction. Rectification thus takes place in the continued flow of the gas up through path 18. The gas reaching the exit end of this path is concentrated to the desired extent with respect to its lighter component. The concentrated lighter gas is withdrawn through port 24 and line 65, a portion of the gas being withdrawn as top product through branch 66 and the remainder being returned as top reflux by pump 68 through branch line 67 into path 17. If desired, line 65 may be provided with a condenser and a condensate trap like trap 70 in line 69 to remove condensible vapor from the gas withdrawn through port 24.

As the gaseous mixture flows downward through path 17 in rectifying column R, it is progressively enriched in heavier component because of the flow of this component through screen 16 from path 18 into path 17 and the diffusion of the lighter component through screen 16 from path 17 into path 18. Thus, the gaseous mixture flowing downward in path 17 is stripped of a substantial portion of the lighter component. Complete stripping of the lighter component in path 18 of the rectifying column R is not possible because of the presence of appreciable amounts of lighter component in stream 62 entering this column. The remainder of the lighter component in the stream leaving path 17 through line 63 is removed in the stripping column S as described hereinbefore.

As already described, the gaseous mixture from the base of path 17 of column R flows through line 63 and trap 64, where condensed water is removed, into line 61 where it mixes with the incoming gaseous mixture, the resultant mixture being fed to column S through inlet 25'.

Figure 6 illustrates a unitary apparatus in which the rectifying and stripping columns have been combined. The parts of this apparatus similar to those of Figure 1 have been identified by the same reference characters. Path 17, at an intermediate point of the length thereof, is provided with an inlet 75 for the feed gaseous mixture. This inlet extends through the jacket 15 and is welded or otherwise suitably secured to wall 14. The lower portion S' of the column of Figure 6 serves as a stripping section and the upper portion R' as a rectifying section corresponding to the separate column S and R, respectively, of Figure 5. Product outlet 26 is provided with a line 76 leading into a trap 77 for removal of condensate. The heavier gas product is withdrawn through line 78 leading from trap 77 and the lighter product through line 79 leading from top outlet 24.

In the type of mass diffusion herein described, the gas and vapor feed rates and pressures, and the cooling medium temperature, preferably are so controlled that the flow of lighter component through the screen just balances the flow of heavier component through the screen in the opposite direction. The particular values selected for feed rates and pressures of gas and vapor and temperature of the cooling medium will depend on the dimensions of the equipment, the porosity of the screen and the properties of the gaseous mixture being separated. By operating under such controlled conditions, optimum conditions for separation can be secured throughout the column.

In prior mass diffusion practice, all of the condensible vapor was added to the light fraction at one point and all was condensed from the heavy fraction at a second point. This resulted in conditions for separation which varied from point to point throughout the apparatus and departed to such an extent from the optimum at most points that the degree of separation attainable in apparatus of a given size was much less than in apparatus of the same size of the type herein described. Use of the apparatus of this invention results in material savings in plant investment, maintenance and operating costs compared with prior mass diffusion apparatus.

For easily separable components, such as hydrogen and methane, a single column of the type shown in Figure 6, or a single pair of columns as shown in Figure 5, will be capable of effecting substantially complete separation into relatively pure light component (hydrogen) and relatively pure heavy component (methane). On the other hand, for difficultly separable components such as $C_{12}H_4$ and $C_{13}H_4$, it is impractical to build a single column or pair of columns of sufficient height to effect substantially complete separation. Under these circumstances, it is advisable to use a cascade of a number of columns of the type shown in Figure 1 or 3, connected in series and parallel as shown in Figure 7. The number of columns in series between the feed point and one of the product ends of the cascade is determined by the concentrations at these two points and the concentration difference spanned by an individual column. The number of columns connected in parallel at a given point in the cascade is determined by the product rate and concentration, the capacity of the individual columns and the concentration at the given point in the cascade. A characteristic of the most efficient arrangement of columns in a cascade is that the greatest number of columns connected in parallel occurs at the feed concentration, and the least at the product concentrations.

In Figure 7, the columns are shown diagrammatically and each comprises a diffusion screen 80 dividing the column into two flow paths 81 and 82, a cooling unit 83 for condensing vapor in flow path 81 and distributor 84 for introducing steam or other readily condensible vapor into flow path 82, so that it is distributed over substantially the entire area of screen 80. This vapor passes through screen 80 and is condensed by cooling unit 83, the condensate being removed through drain line 85.

The columns of Figure 7 are arranged in two banks or groups, one bank R" constituting the rectification group of columns, and the other bank S" constituting the stripping group of columns, each group being constituted of the same number of individual columns. In the embodiment of the invention shown in Figure 7, three columns 86, 87 and 88 discharge a gas stream containing heavier component into a header 89 into which leads the feed gas line 90. This header is provided with lines 91, 92 and 93 leading into the flow path 81 of each of the columns 94, 95 and 96, respectively. The base exit lines 97, 98 and 99 of each of these columns lead into a header 100 from which lines 101 and 102 lead into the flow paths 81 of a pair of columns 103 and 104. The latter two columns have base exit lines 105 and 106 leading into a header 107 from which a line 108 leads into the flow path 81 of a single column 109 provided with an exit line 110 for withdrawal of the heavier component from the system.

Column 109 is provided with a line 111 through which a gas stream containing lighter gas component flows into a header 112 equipped with lines 113 and 114 leading into flow paths 82 of columns 103 and 104, respectively. The latter two columns are equipped with lines 115 and 116, respectively, leading into a header 117 having three lines 118, 119 and 120 leading into the flow paths 82 of the columns 94, 95 and 96, respectively.

Lines 121, 122 and 123 lead from the flow paths 82 of the respective columns 94, 95 and 96 into the flow paths 82 of columns 86, 87 and 88, respectively. From the exit end of the flow paths 82 in the latter three columns lines 124, 125 and 126 lead into a header 127 provided with a pair of lines 128 and 129 leading into the inlet end of flow paths 82 of columns 130 and 131. Lines 132 and 133 lead from the exit end of flow paths 82 of columns 130 and 131 into a header 134 provided with a line 135 leading into the inlet end of flow path 82 in column 136. A line 137 leads from the exit end of flow path 82 in column 136 for withdrawal of the lighter gas component.

Flow path 81 of column 136 through which flow path passes the gas stream containing heavier component diffused through screen 80 is provided with a line 138 leading into a header 139 equipped with lines 140 and 141 which communicate with the inlet end of flow paths 81 in columns 130 and 131, respectively. The exit ends of flow paths 81 of these two columns are provided with lines 142 and 143 leading into a header 144 equipped with three lines 145, 146 and 147 leading into the inlet ends 81 of columns 86, 87 and 88, respectively. The exit ends of flow paths 81 in these three columns are provided with lines 148, 149 and 150, respectively, leading into the header 89 into which the feed gas is supplied and which header, as hereinabove described, communicates by means of lines 91, 92 and 93, respectively, with the columns 94, 95 and 96.

In the operation of the modification of Figure 7 a gaseous mixture is supplied through line 90 entering header 89 where it mixes with the gas streams containing heavier component entering this header through lines 148, 149 and 150 from columns 86, 87 and 88. The resultant gaseous mixture flows through lines 91, 92 and 93, and into the flow path 81 in each of columns 94, 95 and 96. The lighter component diffuses through the steam passing through the diffusion screen 80 in each of these three columns and mixes with the gas flowing through flow paths 82 in these columns, the resultant gas stream exiting from these columns through lines 121, 122 and 123. Heavier component in the streams flowing through the flow paths 82 in these columns passes along with the steam through the diffusion screens 80 into the flow paths 81 in these columns. The steam is condensed and the resultant water removed through the drain lines 85. The gas streams thus enriched with respect to the heavier component flow through lines 97, 98 and 99 into header 100 and thence through lines 101 and 102 through the flow paths 81 in each of columns 103 and 104 where a further stripping of lighter component is effected and the concentration of heavier component still further increased. From columns 103 and 104 the gas streams thus concentrated relative to the heavier component flow through lines 105 and 106 into header 107, thence through line 108 into flow path 81 of column 109 where still further stripping of lighter component and concentration relative to heavier component takes place. A gas consisting substantially entirely of heavier component is withdrawn through line 110.

The lighter fraction in column 109 flows from path 82 of this column through line 111 into header 112, thence through lines 113 and 114 through flow paths 82 of columns 103 and 104. The resultant gas stream flows through lines 115 and 116 into header 117 and thence through lines 118, 119 and 120 through flow paths 82 in columns 94, 95 and 96 through lines 121, 122 and 123 and flow paths 82 in columns 86, 87 and 88. In these columns heavier component along with steam passes through the diffusion screen 80 from flow path 82 to flow path 81 and lighter component diffusing through the steam passes through the screen from flow path 81 to flow path 82 thereby effecting a concentration of the gaseous streams flowing through these two flow paths on opposite sides of the screens, the streams flowing down through paths 81 being concentrated relative to the heavier component and those flowing up through flow paths 82 concentrated relative to the lighter component. In the continued flow through the columns 130, 131 and 136 further concentration of the gas streams flowing through the flow paths 82 in these columns relative to the lighter component takes place so that the stream exiting through line 137 leading from column 136 consists substantially entirely of the lighter component.

For simplicity, only the essential features of the cascade of diffusion columns of Figure 7 have been shown. However, it will be understood that generally it is desirable to supplement the cascade with such auxiliaries as condensate traps and pumps to pass the gas exiting from each subgroup of columns connected in parallel to the next in-series subgroup of columns connected in parallel. In a cascade of the type shown in Figure 7, the rates of flow and other conditions can be adjusted for each column independently of the other columns, so that each column operates at maximum efficiency.

The pressures and temperatures employed on each side of the diffusion screen will depend chiefly on the particular condensible vapor used, the gaseous mixture being separated, and the pore size of the screen. Ordinarily, the temperature of the cooling medium will be that of prevailing cooling water. In general, it is desirable to have the temperature of the cooling medium as low as is conveniently possible without condensing any of the gaseous mixture which is undergoing separation. In general, the temperature of the condensible vapor will be its boiling point at the pressure used in the column; there is no advantage in using superheated vapor. The preferred column pressure depends on several factors. Higher column pressures permit attainment of a lower concentration of condensible vapor in the downstream side of the screen; this results in 'increased equipment capacity. However, if the pressure is too high, the difference in static head of vapors on the two sides of the screen will make it impossible to maintain the optimum pressure differential across the screen at all points. Depending on the screen pore size and the height of the column, the pressure is usually within the range of about 0.01 to 10 atmospheres. For large, commercial installations, a pressure in the vicinity of atmospheric pressure is preferred. The pressure drop through the screen must be controlled to give the optimum flow of condensible vapor. This, in turn, will depend on the vapor concentrations on each side of the screen, the operating pressure level, and the pore size. For screens with practical pore size, this pressure difference will be small. For example, with holes 2 microns in diameter, the preferred pressure difference will be between 0.5 and 2.0 inches of water. The difference in static head on the two sides of the screen should not exceed the pressure drop through the screen. The scope of this invention, however, is not limited by the specific conditions given above.

The folowing example of the invention is given for purposes of illustration only; it will be understood that the invention is not limited to this example.

A stream of carbon monoxide and hydrogen containing 50% carbon monoxide and 50% hydrogen at a temperature of 115° F. is introduced at a rate of 12 standard cubic feet per minute through line 60 in equipment of the type shown in Figure 5 mixing with a stream flowing through line 63 at a rate of 6.7 standard cubic feet per minute containing 45% carbon monoxide, 45% hydrogen and 10% water vapor at a temperature of 115° F. and pressure of 1 atmosphere. The resultant gaseous mixture flows through inlet 25' into flow path 17'. Saturated steam at a temperature of 212° F. and a pressure of 2 inches of water above 1 atmosphere is introduced at a rate of 3.3 pounds per minute through the distributors 19 and 19' covering substantially the full area of the diffusion screens 16 and 16'. Gas is withdrawn through exit 26' at a rate of 20 standard cubic feet per minute, passed through trap 70 where water is removed and ⅔ of this stream recirculated by pump 74 through path 18'; the remainder consisting of 81% carbon monoxide, 9% hydrogen and 10% water vapor is withdrawn at a rate of 6.7 standard cubic feet per minute through line 71.

A gas stream containing 7% hydrogen, 3% carbon monoxide and 90% water vapor flows continuously from exit 24' through line 62 into inlet 23 and path 18 at a rate of 120 standard cubic feet per minute. The gas stream rising through path 18 is enriched in hydrogen and as withdrawn through line 65 contains 9% hydrogen, 1% carbon monoxide and 90% water vapor. The withdrawn stream is passed through a condenser (not shown) where most of the water vapor is condensed and removed. The gas stream leaving this condenser contains 81% hydrogen, 9% carbon monoxide and 10% water vapor. Half of this stream is recirculated by pump 68 through line 67 into flow path 17, and the other half (6.7 standard cubic feet per minute) discharges through line 66 as light product.

In the foregoing example, the rectifying column R has the following approximate dimensions: the cooling surface 14 is 7 inches in diameter, the screen 16 is 6 inches in diameter and 0.048 inch in thickness, and steam distributor 19 is 5 inches in diameter. Column R is 20 feet in length. The diffusion screen 16 is a porous sheet of stainless steel of which 10% is free area made up of pores averaging 1 micron in diameter. The stripping column S has the same dimensions.

It will be noted this invention provides a mass diffusion process of greater efficiency which is more economical to practice than prior known processes. By using a relatively long column a gaseous mixture can be separated into its components in a single column, or, if preferred, in a pair of columns, as shown, for example, in Figure 5. Hence, this invention requires substantially less stages for obtaining the desired separation of components of a gas mixture than prior known mass diffusion procedures.

For the purposes of this invention, a lighter gaseous component is one which has a diffusion coefficient into the condensible vapor that is greater than the diffusion coefficient of the heavier gaseous component into that condensible vapor. As hereinbefore mentioned, in some cases, the lighter component may have a density greater than that of the heavier component.

The condensible vapor is selected so that the ratio of the diffusion coefficients of the gases to be separated by mass diffusion into the vapor is relatively large. The larger the ratio of the diffusion coefficients, the smaller will be the number of stages or columns required to effect a desired separation of gaseous components. However, this desideratum should, as a practical matter, be reconciled with the fact that a condensible vapor selected to give a very large ratio of diffusion coefficients may involve such small diffusion coefficients that the throughput of the diffusion system is undesirably small. Accordingly, the condensible vapor should be chosen to give a reasonably large ratio of diffusion coefficients while avoiding too low values for the individual diffusion coefficients. In this way, the desired separation can be carried out in a reasonable number of diffusion stages or columns and with a reasonable throughput.

It will be understood that the gaseous mixture treated by the process of this invention may contain more than two components. In such cases, one of the gaseous fractions resulting from the separation is enriched in one or more of the components and the other fraction is enriched in the remaining components of the gaseous mixture.

Certain changes in carrying out the process and in the mass diffusion apparatus of this invention may be made without departing from its spirit or scope. For instance, the gaseous mixture may be introduced into either or even both of the paths which are separated by the diffusion barrier. Flow through the two paths in the diffusion column may be concurrent but countercurrent flow is preferred. A cascade of diffusion columns like that shown in Figure 7 may have different numbers of columns on opposite sides of the point at which the gaseous mixture is fed to the cascade. Therefore, it is intended that all matter contained in the foregoing description or shown in the accompanying drawings shall be interpreted as illustrative and not in a limiting sense.

What is claimed is:

1. In the process of separating a gaseous mixture containing heavier and lighter components into fractions enriched in said components, which process comprises introducing a stream of said gaseous mixture into a flow path separated from a second flow path by a diffusion screen, the improvement comprising the steps of flowing said stream through the first-mentioned flow path countercurrent to a stream of gas flowing through said second flow path, projecting a condensible vapor substantially uniformly across the first-mentioned flow path onto said screen so as to cover substantially the full area of said screen and effecting flow of heavier component from the gaseous mixture flowing through the first-mentioned flow path through said screen along with said vapor into said second flow path and of lighter component from the stream of gas passing through said second flow path through said screen into the first-mentioned flow path, condensing within said second flow path said vapor passing thereinto, withdrawing from the first-mentioned flow path a gaseous stream containing a materially greater proportion of lighter component than is contained in said gaseous mixture, and withdrawing from said second flow path a gaseous stream containing a materially greater proportion of heavier component than is contained in said gaseous mixture.

2. In the process of separating hydrogen from a gaseous mixture containing hydrogen, which process comprises introducing a stream of said gaseous mixture into a flow path separated from a second flow path by a diffusion screen, the improvement comprising the steps of flowing said stream through the first-mentioned flow path countercurrent to a gaseous stream flowing through said second flow path, projecting steam substantially uniformly across the first-mentioned flow path onto substantially the full area of said screen and effecting flow of said steam through said screen into said second flow path and of hydrogen from said gaseous stream flowing through said second flow path through said screen into the first-mentioned flow path, condensing the steam flowing into said second flow path, removing the condensed steam from said second flow path, withdrawing from the first-mentioned flow path a gaseous stream containing a materially greater proportion of hydrogen than is contained in said gaseous mixture, and withdrawing from said second flow path a gaseous residue containing a materially smaller proportion of hydrogen than is contained in said gaseous mixture.

3. A gas separating apparatus comprising an inner compartment, an outer compartment surrounding the inner compartment, a diffusion screen as separating wall between said two compartments, a gaseous inlet port communicating with one of said two compartments, a gaseous outlet port communicating with each of said two compartments, cooling surface in said outer compartment, and means for introducing a condensible vapor as a multiplicity of streams into said inner compartment into contact with substantially the entire area of said diffusion screen.

4. A mass diffusion apparatus for separating gaseous mixtures, comprising a cylindrical chamber, a cooling jacket surrounding the outer wall of said cylindrical chamber, a cylindrical diffusion screen disposed within said chamber forming an outer annular flow path separated by said screen from an inner flow path, a gaseous inlet port and a gaseous outlet port communicating with each of said two flow paths, and a distributor for a condensible vapor disposed in said inner flow path and arranged to distribute said vapor as a multiplicity of streams flowing into contact with substantially the entire area of said screen.

5. A mass diffusion apparatus for separating gaseous mixtures, comprising two groups of mass diffusion columns; each column comprising a jacketed chamber for flow of a cooling medium through the jacket, a diffusion screen within said chamber dividing it into two flow paths, one of said paths being contiguous to said jacket, and means for introducing a multiplicity of condensible vapor streams into the other of said paths to contact substantially the entire area of said screen and flow therethrough into the path contiguous to said jacket; each group consisting of subgroups of decreasing number of columns and the columns in each group being connected so that gases flow in parallel through the columns of each subgroup and in series from the subgroup of largest number of columns to the subgroup of smallest number of columns; means for introducing the gaseous mixture to be separated into the subgroup of largest number of columns in one of said groups; and means for withdrawing a separated gas from the subgroup of smallest number of columns in each of said groups.

6. In the mass diffusion process for the separation of a gaseous mixture containing heavier and lighter components into two fractions, respectively, enriched relative to said heavier and lighter components, the improvement which comprises passing a condensible vapor at a substantially uniform rate from one side of the diffusion screen through substantially the entire area of said screen to the opposite side of said screen to promote the flow of said heavier component through said screen concurrently with said vapor passing therethrough while permitting said lighter component to diffuse through said screen countercurrently to said vapor passing therethrough.

7. The process of claim 6 wherein the condensible vapor is steam.

8. In the mass diffusion process for the separation of a gaseous mixture containing heavier and lighter components into two fractions, respectively, enriched relative to said heavier and lighter components, which process involves two flow paths separated by a diffusion screen, the improvement which comprises passing a condensible vapor at a substantially uniform rate across one of said flow paths, through substantially the entire area of said screen and across the other of said flow paths to promote the flow of said heavier component through said screen concurrently with said vapor passing therethrough while permitting said lighter component to diffuse through said screen countercurrently to said vapor passing therethrough, and withdrawing the fraction enriched relative to said lighter component from the first-mentioned flow path and the fraction enriched relative to said heavier component from said other flow path.

9. The process of claim 8 wherein the gaseous mixture contains hydrogen and one of the withdrawn fractions is enriched relative to said hydrogen.

10. The process of claim 9 wherein the condensible vapor is steam.

11. In the mass diffusion process for the separation of a gaseous mixture containing heavier and lighter components into two fractions, respectively, enriched relative to said heavier and lighter components, which process involves two flow paths separated by a diffusion screen, the improvement which comprises passing a condensible vapor substantially uniformly across one of said flow paths, through substantially the entire area of said screen and across the other of said flow paths to promote the flow of said heavier component through said screen concurrently with said vapor passing therethrough while permitting said lighter component to diffuse through said screen countercurrently to said vapor passing therethrough, maintaining gaseous flows in said flow paths countercurrent to one another, and withdrawing at opposite ends of said flow paths the fraction enriched relative to said lighter component from the first-mentioned flow path and the fraction enriched relative to said heavier component from said other flow path.

12. A mass diffusion apparatus for separating the components of gaseous mixtures, comprising two contiguous, elongate ducts, a diffusion screen forming a wall common to both of said ducts, a gaseous inlet port and a gaseous outlet port at the opposite ends of each of said ducts, the two inlet ports being positioned at opposite ends of said two ducts to effect countercurrent flow of the gases passing through said two ducts, means for introducing a multiplicity of spaced streams of a condensible vapor into one of said ducts into contact with substantially the entire area of said screen, and means for condensing said vapor disposed in the other of said ducts.

13. The mass diffusion apparatus of claim 12 wherein the means for introducing a multiplicity of spaced streams of a condensible vapor is a tube extending lengthwise through one of said ducts and having a multiplicity of perforations spaced along the length of said tube.

MANSON BENEDICT.

REFERENCES CITED

The following references are of record in the file of this patent:

UNITED STATES PATENTS

| Number | Name | Date |
|---|---|---|
| 1,496,757 | Lewis et al. | June 3, 1924 |
| 1,881,490 | Gmelin et al. | Oct. 11, 1932 |
| 2,255,069 | Maier | Sept. 9, 1941 |
| 2,494,554 | Harlow | Jan. 17, 1950 |
| 2,497,898 | McGurl | Feb. 21, 1950 |

FOREIGN PATENTS

| Number | Country | Date |
|---|---|---|
| 291,576 | Great Britain | June 7, 1928 |
| 367,313 | Great Britain | Feb. 18, 1932 |